(12) United States Patent
Rieth et al.

(10) Patent No.: US 7,267,209 B2
(45) Date of Patent: Sep. 11, 2007

(54) ELECTROMECHANICALLY-OPERATED DISC BRAKE FOR MOTOR VEHICLES

(75) Inventors: Peter Rieth, Eltville (DE); Enno Kelling, Echborn (DE); Bernd Piller, Dreieich (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 210 days.

(21) Appl. No.: 10/526,662

(22) PCT Filed: Aug. 8, 2003

(86) PCT No.: PCT/EP03/08841

§ 371 (c)(1),
(2), (4) Date: Mar. 4, 2005

(87) PCT Pub. No.: WO2004/016965

PCT Pub. Date: Feb. 26, 2004

(65) Prior Publication Data

US 2006/0163013 A1    Jul. 27, 2006

(30) Foreign Application Priority Data

Aug. 13, 2002 (DE) ............................... 102 36 972
Dec. 10, 2002 (DE) ............................... 102 57 508

(51) Int. Cl.
*F16D 65/34* (2006.01)
(52) U.S. Cl. .................. 188/156; 188/158; 303/20
(58) Field of Classification Search ........... 188/72.7, 188/72.8, 156, 157, 158, 159, 160, 161, 162, 188/163, 164; 303/20, DIG. 10; 701/70
See application file for complete search history.

(56) References Cited

U.S. PATENT DOCUMENTS

| | | | |
|---|---|---|---|
| 4,760,898 A | | 8/1988 | Nyquiest |
| 5,915,504 A | * | 6/1999 | Doricht ................. 188/72.8 |
| 6,321,884 B1 | * | 11/2001 | Balz ........................ 188/161 |
| 6,810,316 B2 | * | 10/2004 | Yokoyama et al. ......... 701/70 |
| 2003/0121734 A1 | * | 7/2003 | Staltmeir ............. 188/73.31 |
| 2006/0196289 A1 | * | 9/2006 | Nilsson ................ 74/411.5 |

FOREIGN PATENT DOCUMENTS

| | | |
|---|---|---|
| DE | 196 15 186 C1 | 8/1997 |
| DE | 196 29 936 C1 | 11/1997 |
| DE | 100 54 938 A1 | 5/2002 |
| DE | 100 61 950 A1 | 7/2002 |
| WO | WO98/27357 | 6/1998 |
| WO | WO 02/47953 A1 | 6/2002 |

* cited by examiner

Primary Examiner—Thomas Williams
(74) Attorney, Agent, or Firm—RatnerPrestia

(57) ABSTRACT

The present invention relates to an electromechanically operable disc brake for motor vehicles comprising a brake caliper and an actuator arranged at the brake caliper, with two friction linings cooperating with each one lateral surface of a brake disc, with at least one of the friction linings being movable into engagement with the brake disc by way of the actuator, and the actuator having an electric motor that is driven by means of an electronic control and regulation unit.

To achieve a compact disc brake, the invention discloses that the control and regulation unit is arranged directly at the actuator. This provision renders it possible to configure the electric connection as a plug coupling, which offers financial and safety advantages.

6 Claims, 3 Drawing Sheets

ELECTROMECHANICALLY-OPERATED DISC BRAKE FOR MOTOR VEHICLES

TECHNICAL FIELD

The present invention generally relates to electromechanically operable disc brakes for motor vehicles and more particularly relates to an electromechanically operable disc brake for motor vehicles comprising a brake caliper and an actuator arranged at the brake caliper.

BACKGORUND OF THE INVENTION

International patent application WO 98/27357 discloses an electromechanically operable disc brake of this type. In the prior art disc brake, the tensional force to be generated by the actuator is controlled by means of a force-measuring device interposed in the flux of force between the brake caliper and the actuator. However, the above-mentioned publication does not convey to the one skilled in the art any indication with respect to the positioning of the control and regulation unit relative to the disc brake.

An arrangement is feasible wherein the control and regulation unit is accommodated in an appropriate space of the motor vehicle separated from the disc brake. In this case, it is needed to provide an electric connection over a certain distance. Related thereto are additional sophisticated measures as regards the electromagnetic compatibility, which must be considered a shortcoming. Another disadvantage is seen in the fault liability of such an electric connection, due to outside mechanical influences, for example.

BRIEF SUMMARY OF THE INVENTION

In view of the above, an object of the invention is to improve an electromechanically operable disc brake of the type mentioned before such as to achieve a compact design that is optimized in terms of mounting space, while there is no need for electric connections such as lines or cables.

According to the invention, this object is achieved in that the control and regulation unit is arranged at the actuator. In a favorable improvement of the subject matter of the invention, the control and regulation unit is thermally uncoupled from the actuator. These provisions render the design compact and protect the control and regulation unit against thermal influences of the adjacent actuator and the brake caliper.

To render the idea of the invention more specific, it is arranged that the thermal uncoupling is achieved by means of spacers between the actuator and the control and regulation unit.

In another favorable embodiment of the subject matter of the invention, the electric connection between the control and regulation unit and the actuator is provided as a plug coupling. This measure will considerably increase the reliability of operation of the disc brake because the plug coupling is less sensitive to mechanical influences.

In an advantageous embodiment of the subject matter of the invention, the control and regulation unit is connected to the actuator in such a fashion that their separation is only possible with special tools. This will safeguard a protection against unauthorized use.

Another favorable feature of the subject matter of the invention involves that both the actuator and the control and regulation unit are designed as subassemblies that can be independently handled and tested.

DETAILED DESCRIPTION OF THE PREFERRED EMBODIMENTS

Figure 1:
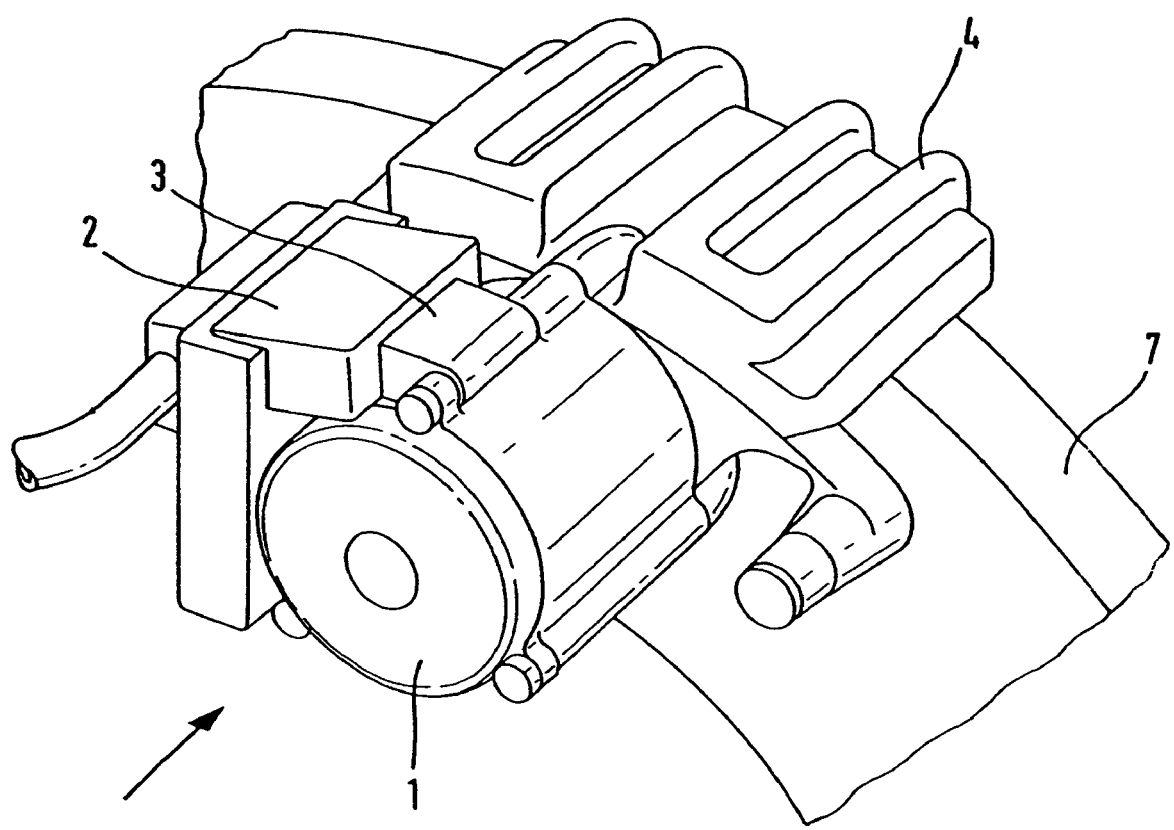
FIG. 1 is a schematic, three-dimensional view of a design of the electromechanically operable disc brake according to the invention.
Figure 2:
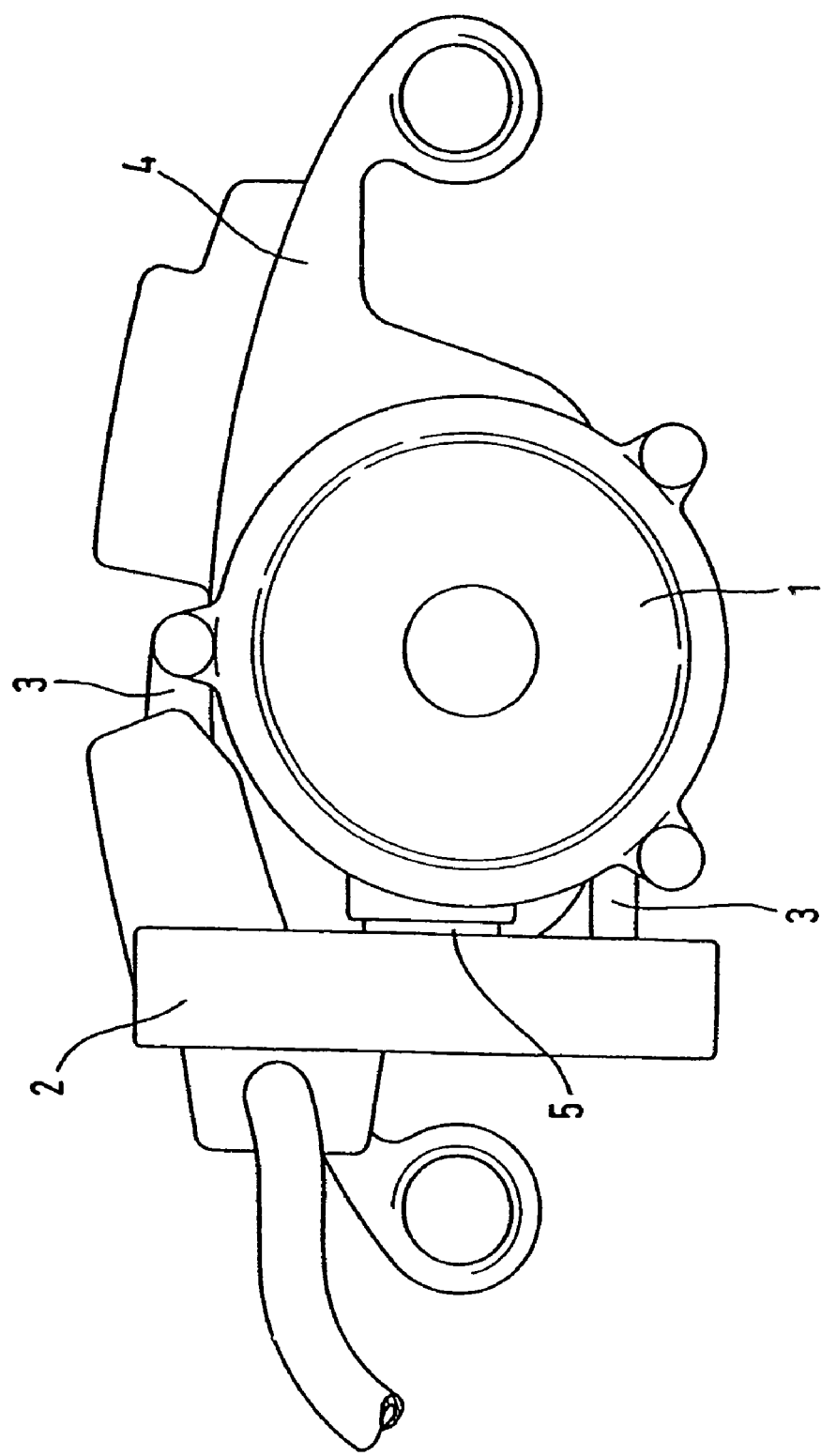
FIG. 2 is a view of the design shown in FIG. 1 in the direction of the arrow plotted in FIG. 1.

In the electromechanically disc brake of the invention illustrated in FIG. 1, the actuating element is used for the actuation of a floating-caliper disc brake, having a brake caliper 4 (shown only schematically) that is displaceably mounted in a stationary mounting support (not shown). A pair of non-illustrated friction linings is arranged in the brake caliper 4 in such a fashion as to be facing the left and the right lateral surface of a brake disc 7.

While one of the friction linings is movable into direct engagement with the brake disc 7 by means of an actuating element (not shown) through the actuator 1, the second one of the friction linings is urged against the opposite lateral surface of the brake disc 7 by the effect of a reaction force that is produced by the brake caliper 4 when the arrangement is actuated.

The disc brake of the invention has a modular construction and is basically composed of three subassemblies that can be handled and tested independently, i.e. an actuator 1, a control and regulation unit 2, and the above-mentioned brake caliper 4.

Figure 3:
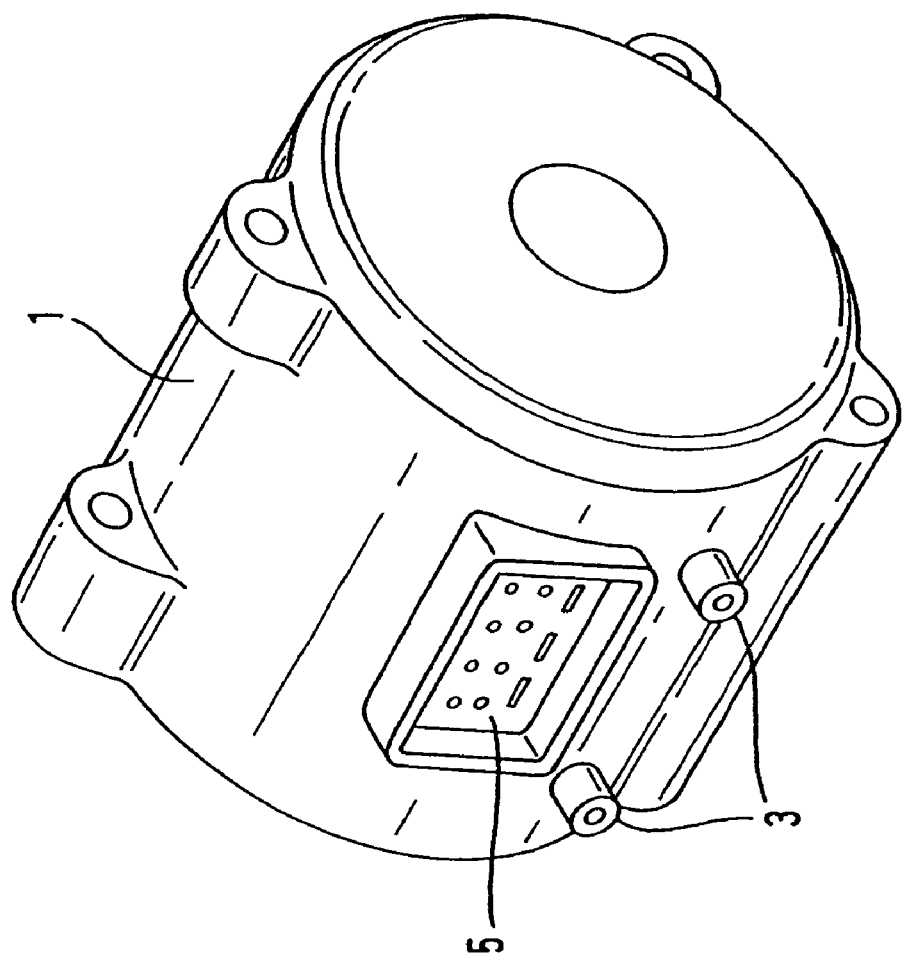
FIG. 3 is a schematic view of the modular construction of the design shown in FIG. 1.
Figure 3:
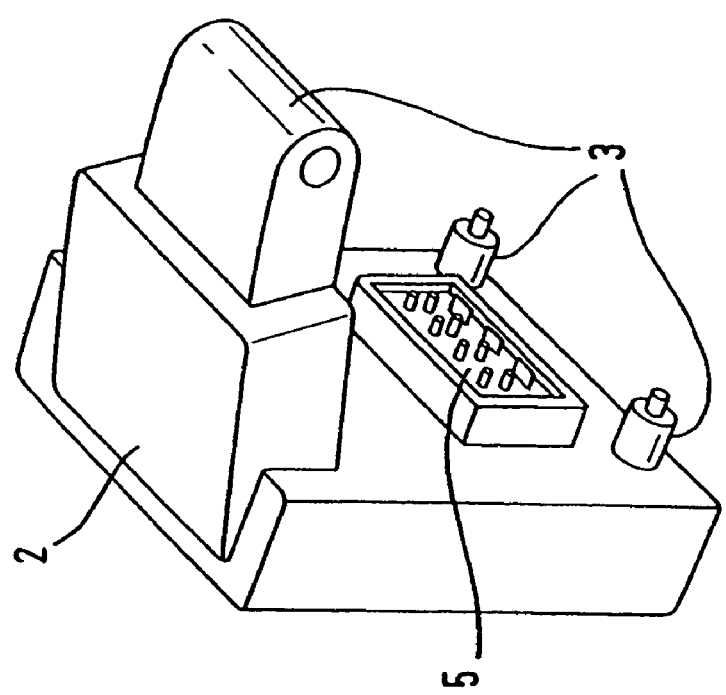

The control and regulation unit 2 is fitted directly to the actuator 1. The frictional heat developing during actuation of the disc brake and the heat losses of actuator 1 are kept away from the control and regulation unit 2 by means of spacers 3. As illustrated in FIG. 3, spacers 3 are mounted both on the control and regulation unit 2 and on the actuator 1. Said spacers consist of a heat-insulating material and are preferably configured as catch-type connections. Thus, the control and regulation unit 2 is thermally uncoupled from the other two modules and is not jeopardized by malfunctions or failure due to thermal stress.

The fact that the control and regulation unit 2 is fitted to the actuator 1 renders it possible to carry out the electric connection 5 between these two modules in a particularly low-cost fashion, such as in the way of a plug coupling. As shown in FIG. 3, a contact bar is provided on the side of the control and regulation unit 2 close to the actuator 1. The bushing that is represented in FIG. 3 and lies opposite the contact bar forms together with the contact bar this stable electric connection 5. Sophisticated measures with respect to the electromagnetic compatibility can be omitted due to this plug coupling 5. In addition, this compact electric plug coupling 5 is protected against mechanical stress acting from the outside and thereby contributes to enhancing the reliability of operation of the disc brake of the invention.

The control and regulation unit 2 is connected to the actuator 1 by way of the spacers 3 and the electric plug coupling 5 in such a manner that the connection can be separated only by means of special tools. This prevents an improper separation by unauthorized persons. However, the modular design allows exchanging the individual subassemblies in the case of a defect.

The invention claimed is:

1. An electromechanically operable disc brake for motor vehicles comprising a brake caliper and an actuator arranged at the brake caliper, with two friction linings cooperating with each one lateral surface of a brake disc, with at least one of the friction linings being movable into engagement with the brake disc by way of the actuator, and the actuator having an electric motor that is driven by means of an electronic control and regulation unit, the control and regulation unit being arranged at the actuator, the disc brake further comprising a plurality of first spacers extending from the control and regulation unit, and a plurality of second spacers extending from the actuator, the plurality of first spacers coupling with the plurality of second spacers to interconnect the control and regulation unit with the actuator, the first and second spacers forming a gap between the control and regulation unit and the actuator.

2. The electromechanically operable disc brake as claimed in claim 1, wherein the control and regulation unit is thermally uncoupled from the actuator.

3. The electromechanically operable disc brake as claimed in claim 2, wherein the thermal uncoupling is achieved by means of spacers between the actuator and the control and regulation unit.

4. The electromechanically operable disc brake as claimed in claim 2, wherein both the actuator and the control and regulation unit are designed as subassemblies that can be independently handled and tested.

5. The electromechanically operable disc brake as claimed in claim 1, wherein the electric connection between the control and regulation unit and the actuator is provided as a plug coupling.

6. The electromechanically operable disc brake as claimed in claim 5, wherein the plurality of first spacers and the plurality of second spacers comprise a heat-insulating material.

* * * * *